United States Patent [19]

Bohman

[11] 4,372,905
[45] Feb. 8, 1983

[54] METHOD OF FORMING A PIPE SOCKET

[75] Inventor: Nils-Erik Bohman, Forsheda, Sweden

[73] Assignee: Forsheda Gummifabrik AB, Forsheda, Sweden

[21] Appl. No.: 221,386

[22] Filed: Dec. 30, 1980

[30] Foreign Application Priority Data

Jan. 14, 1980 [SE] Sweden ................................ 8000270

[51] Int. Cl.³ .................... B22D 11/126; B29C 19/00
[52] U.S. Cl. ..................................... 264/249; 264/320;
264/241; 264/242; 264/318; 264/308; 264/256;
264/275; 264/274; 277/1; 277/DIG. 6;
29/527.2; 29/527.1; 29/400 C
[58] Field of Search .................. 29/527.2, 527.1, 530,
29/156.6, 400 C; 277/1, DIG. 6, 228, 9.5, 226,
215; 264/318, 320, 242, 249, 241, 259, 267, 264,
268, DIG. 77, 269, 274, 275, 308, 256

[56] References Cited

U.S. PATENT DOCUMENTS 3,510,140  5/1970  Hermann ............................. 277/1

Primary Examiner—Francis S. Husar
Assistant Examiner—V. K. Rising
Attorney, Agent, or Firm—Holman & Stern

[57] ABSTRACT

The invention relates to a method of forming a pipe socket having a sealing ring (8) at the inner surface of the pipe socket wall. The sealing ring has a fastening portion (16) and a sealing portion (20) connected therewith. The sealing portion (20) is displaceable in the axial direction of the pipe socket to be able to take different positions therein in order to adapt to different tolerances. It is a problem that the sealing portion (20) because of its displacability is not adapted to constitute such a surface around which the pipe wall can be formed. In order to obviate this drawback the pipe wall is formed so that the sealing portion (20) is positioned outside the pipe socket during the forming operation, whereupon the sealing portion is folded into the pipe socket after the forming operation.

4 Claims, 4 Drawing Figures

METHOD OF FORMING A PIPE SOCKET

The present invention relates to a method of forming a pipe socket having a sealing ring positioned at the inner surface of the pipe socket wall, said sealing ring having a fastening portion and a sealing portion connected therewith.

When preparing a pipe socket it is previously known to form the wall of the pipe socket and to provide the pipe socket with a sealing ring positioned at the inner surface thereof by tensioning the sealing ring on to a forming mandrel, forming the wall of the pipe socket around the mandrel and the sealing ring positioned thereon and to remove the wall of the pipe socket with the sealing ring positioned in the pipe socket from the mandrel. Thus, there is in one single operation provided a pipe socket having an inner groove for receiving a sealing ring and a mounting of the sealing ring in said groove. This manufacturing method can be used in the manufacturing of pipe sockets of many different types of material but is especially well suited for the manufacturing of pipe sockets of plastic material. Thereby it is for example possible to manufacture the pipe socket as a thread or fibre reinforced plastic socket, for example a glass fibre reinforced polyester socket. It is also possible to manufacture the pipe socket by winding strip shaped thermoplastic material around the mandrel and the sealing ring positioned thereon and heating the thermoplastic material.

However, especially in the manufacturing of pipe sockets having large dimensions it is difficult to manufacture a pipe section with a sealing ring fastened therein, in which the sealing ring is able to adapt to the large dimensional deviations which appear at these large dimensions. In pipe sockets it is per se previously known to use sealing rings consisting of a fastening portion and a sealing portion connected therewith, the fact that the sealing portion is connected with the fastening portion by means of an elastic connector portion giving the sealing portion the capacity of taking different positions in a clearance space between the inner surface of the socket and the outer surface of a spigot end introduced therein in order to adapt to different clearance space dimensions. However, when using sealing rings of this kind it has up to now not been possible to use the forming method described above when manufacturing the pipe socket. This is caused by the fact that the sealing portion due to its elasticity for being able to adapt to different clearance space dimensions has insufficient stability for constituting such a forming surface around which the pipe socket can be formed.

Therefore, the object of the present invention is to provide a method for forming a pipe socket, in which the forming method described above can be used also in the case that the pipe socket shall be provided with a sealing ring of the type described above having the capacity of adapting to different clearance space dimensions.

In order to comply with this object there is in accordance with the invention provided a method of forming a pipe socket having a sealing ring positioned at the inner surface of the wall of the pipe socket, said sealing ring having a fastening portion and a sealing portion connected therewith, wherein the pipe wall is formed around a substantially cylindrical form surface, the method being characterized in that the sealing ring is positioned around the form surface with the fastening portion and the sealing portion positioned axially beside each other, that the pipe wall is formed around the form surface and the fastening portion of the sealing ring while leaving at least the main portion of the sealing portion outside the end of the pipe wall and that the sealing portion is folded inwards against the inner side of the pipe wall after the pipe wall has been removed from the form surface with the fastening portion of the sealing ring retained in the pipe wall.

Thereby it is preferred that there is formed at the inner side of the pipe wall a surface which conically widens in the direction from the end of the pipe wall, said surface being adapted to co-operate with the sealing portion of the sealing ring.

Suitably the substantially conically widening surface is formed by means of a separate mould portion, which together with the sealing ring is tensioned on to a mandrel in order to constitute a portion of the form surface. Suitably the separate mould portion and the sealing ring engage each other during the forming of the pipe wall.

Thus, it has according to the invention become possible to form in one single operation a pipe socket having a sealing ring fastened to the inner surface of the pipe socket wall, which sealing ring is of the kind having a fastening portion and a sealing portion connected therewith and thereby being of such a kind that it can adapt to large deviations of the dimensions of the clearance space between the inner surface of the wall of the pipe socket and the outer surface of a spigot end introduced into the pipe socket.

The invention is described in the following with reference to the accompanying drawings.

Figure 1:
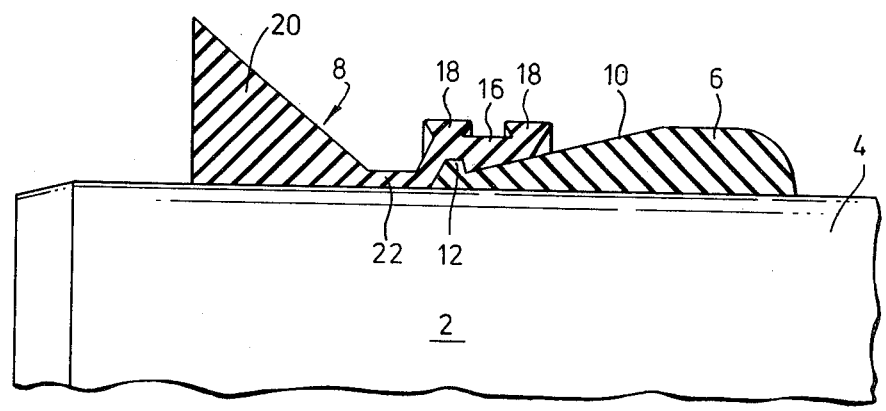
FIGS. 1, 2 and 3 show three different steps of the forming of a pipe socket in accordance with the invention.

In FIG. 1 there is shown a part of an axial section of a mandrel 2 having a substantially cylindrical outer surface 4, a mould portion 6 consisting of rubber elastic material tensioned on to the mandrel and a sealing ring 8 consisting of rubber elastic material also tensioned on to the mandrel. It is recognized that the mould portion 6 and the sealing ring 8 are symmetrical with regard to the axis of the mandrel 2. The mould portion 6 has a conical form surface 10 and has a peripheral projection 12 angaging a corresponding peripheral groove 14 in the sealing ring 8.

The sealing ring 8 has a fastening portion 16 having two parts 18 having dovetail shaped sections, a sealing portion 20 having a substantially triangular section and a connector portion 22 having a relatively thin section and connecting the sealing portion 20 with the fastening portion 16.

As mentioned above the mould portion 6 and the sealing ring 8 are stretched over the cylindrical outer surface 4 of the mandrel, the mould portion 6 being thereby axially fixed in relation to the sealing ring 8 by the fact that the projection 12 thereof engages the groove 14.

Figure 2:
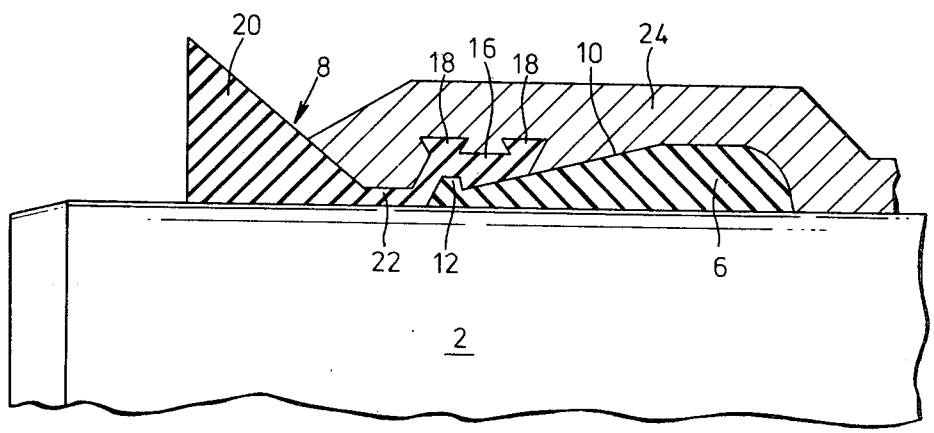

A pipe socket with the sealing ring 8 fastened therein is manufactured by forming the material which shall constitute the wall of the pipe socket around the mandrel, the mould portion 6 and the fastening portion 18, the connector portion 22 and the part of the sealing portion 20 adjacent the connector portion 22 of the sealing ring. For example it is possible to manufacture the pipe wall by means of strip shaped thermoplastic material, which is wound around the mandrel, the mould portion and said portions of the sealing ring. Thereby the edges of the strip material are wound either so that they overlap each other or so that the edge surfaces contact each other, whereupon the strip material is unified to a continuous, closed pipe wall 24 by means of heat and pressure. As appears from FIG. 2 the pipe wall extends only over the part of the sealing portion 20, which is adjacent to the connector portion 22.

Figure 3:
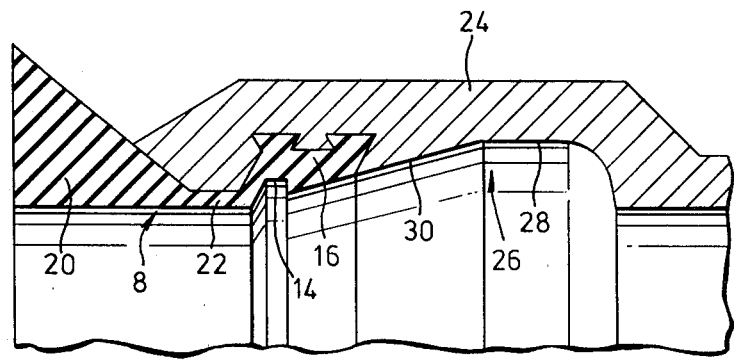
Figure 4:
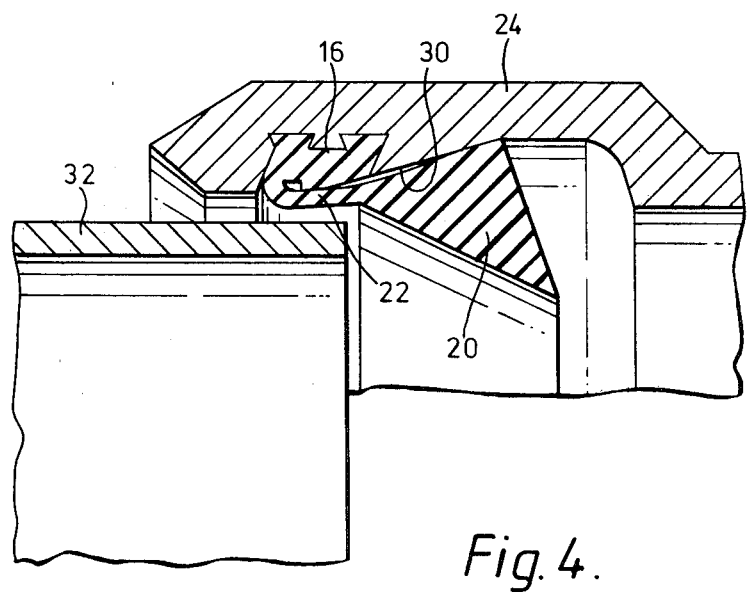
FIG. 4 is an axial section of the wall of a pipe socket manufactured according to the invention.

After the pipe wall 24 has been formed and the wall has hardened the mandrel 2 and the mould portion 6 are removed, whereupon the pipe wall 24 and the sealing ring 8 positioned therein have the appearance according to FIG. 3. Thus, the mould portion 6 has formed a peripheral recess 26 in the pipe wall 24, said recess having a cylindrical portion 28 and a conical portion 30. Finally the sealing portion 20 is folded into the recess 26 to the position shown in FIG. 4. Thereby the portion 20 engages the conical portion 30 of the recess 26. Because of the fact that the sealing portion 20 is connected with the fastening portion 16 by means of the thin connector portion 22, the sealing portion 20 can take the position which is most suitable with regard to the clearance space dimension between the inner surface of the pipe socket and the outer surface of a spigot end 32 introduced into the pipe socket. Thereby, a pipe socket according to the invention will operate in a satisfying manner within large tolerances with regard to the clearance space dimensions.

The invention can be modified within the scope of the following claims. Thus, it is possible to use said method of forming a pipe socket also in connection with other materials for constituting the pipe socket than plastic materials.

I claim:

1. A method of forming a pipe socket having a sealing ring positioned at the inner surface of the wall of the pipe socket, said sealing ring having a fastening portion and a sealing portion connected therewith, the pipe wall being formed around a substantially cylindrical formed surface, characterized in that the sealing ring (8) is positioned around the form surface with the fastening portion (16) and the sealing portion (20) positioned axially adjacent each other, that the pipe wall (24) is formed around the form surface and the fastening portion of the sealing ring while leaving at least the main portion of the sealing portion outside the end of the pipe wall and that the sealing portion is folded against the inner side of the pipe wall after the pipe wall has been removed from the form surface with the fastening portion retained in the pipe wall.

2. A method as claimed in claim 1, characterized in that a surface (30) which conically widens in the direction from the end of the pipe wall is formed at the inner side of the pipe wall, said surface being adapted to cooperate with the sealing portion (20) of the sealing ring (8).

3. A method as claimed in claim 2, characterized in that said substantially conical surface (30) is formed by means of a separate mould portion (6) which together with the sealing ring (8) is stretched over a mandrel (2) in order to constitute a part of the form surface.

4. A method as claimed in claim 3, characterized in that the separate mould portion (6) and the sealing ring (8) are positioned in engagement with each other when being stretched over the mandrel (2).

* * * * *